United States Patent
Mundkur et al.

(10) Patent No.: US 8,281,013 B2
(45) Date of Patent: *Oct. 2, 2012

(54) NON-DISRUPTIVE, RELIABLE LIVE MIGRATION OF VIRTUAL MACHINES WITH NETWORK DATA RECEPTION DIRECTLY INTO VIRTUAL MACHINES' MEMORY

(75) Inventors: Sambhrama Madhusudhan Mundkur, Sammamish, WA (US); Alireza Dabagh, Kirkland, WA (US); Dustin Lyle Green, Redmond, WA (US); Narasimha Rao S. S. Nagampalli, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,402

(22) Filed: Jul. 29, 2011

(65) Prior Publication Data

US 2012/0030674 A1 Feb. 2, 2012

Related U.S. Application Data

(63) Continuation of application No. 12/332,800, filed on Dec. 11, 2008, now Pat. No. 7,996,484.

(51) Int. Cl.
*G06F 9/455* (2006.01)
(52) U.S. Cl. ............. 709/226; 718/1; 709/213; 709/214
(58) Field of Classification Search .................. 709/226, 709/213; 718/1
See application file for complete search history.

(56) References Cited

U.S. PATENT DOCUMENTS

| | | | |
|---|---|---|---|
| 6,941,406 B2 | 9/2005 | Sano et al. | |
| 7,383,405 B2 | 6/2008 | Vega et al. | |
| 7,500,246 B2 | 3/2009 | Saake et al. | |
| 7,716,667 B2 | 5/2010 | Van Rietschote et al. | |
| 2003/0093496 A1* | 5/2003 | O'Connor et al. | 709/217 |
| 2005/0102671 A1 | 5/2005 | Baumberger | |
| 2005/0177635 A1 | 8/2005 | Schmidt et al. | |
| 2007/0192765 A1 | 8/2007 | Shimogawa et al. | |
| 2007/0198723 A1* | 8/2007 | An et al. | 709/226 |
| 2007/0204265 A1* | 8/2007 | Oshins | 718/1 |

(Continued)

OTHER PUBLICATIONS

Harney et al., The Efficacy of Live Virtual Machine Migrations Over the Internet, Virtualization Technology in Distributed Computing (VTDC), 2007., Second International Workshop on Virtualization technology in distributed computing Article No. 8, ACM New York, NY, USA 2007.*

(Continued)

*Primary Examiner* — Wing Chan
*Assistant Examiner* — Kostas Katsikis
(74) *Attorney, Agent, or Firm* — Woodcock Washburn LLP

(57) ABSTRACT

Techniques are disclosed for the non-disruptive and reliable live migration of a virtual machine (VM) from a source host to a target host, where network data is placed directly into the VM's memory. When a live migration begins, a network interface card (NIC) of the source stops placing newly received packets into the VM's memory. A virtual server driver (VSP) on the source stores the packets being processed and forces a return of the memory where the packets are stored to the NIC. When the VM has been migrated to the target, and the source VSP has transferred the stored packets to the target host, the VM resumes processing the packets, and when the VM sends messages to the target NIC that the memory associated with a processed packet is free, a VSP on the target intercepts that message, blocking the target NIC from receiving it.

20 Claims, 3 Drawing Sheets

U.S. PATENT DOCUMENTS

| | | |
|---|---|---|
| 2007/0283348 A1 | 12/2007 | White |
| 2008/0034365 A1 | 2/2008 | Dahlstedt |
| 2008/0140866 A1 | 6/2008 | Corry et al. |
| 2008/0163239 A1 | 7/2008 | Sugumar et al. |
| 2009/0172125 A1 | 7/2009 | Shekhar et al. |
| 2009/0300606 A1 | 12/2009 | Miller et al. |
| 2010/0071025 A1 | 3/2010 | Devine et al. |
| 2010/0083276 A1* | 4/2010 | Green et al. .................. 719/313 |
| 2010/0125845 A1* | 5/2010 | Sugumar et al. .................. 718/1 |

OTHER PUBLICATIONS

"VMware Infrastructure 3," VMware, Inc., http://www.vmware.com/files/pdf/vi_brochure.pdf, 2008, p. 1-4.

Clark et al., "Live Migration of Virtual Machines," http://www.cl.cam.ac.uk/research/srg/netos/papers/2005-migration-nsdi-pre.pdf, downloaded 2009, p. 1-14.

"Live Migration with AMD-V Extended Migration Technology," Advanced Micro Devices, http://developer.amd.com/assets/Live%20Virtual%20Machine%20Migration%20on%20AMD%20processors.pdf, 2007, p. 1-8.

"Migrate Virtual Machines with Zero Downtime," Vmware, Inc., http://www.vmware.com/products/vi/vc/vmotion.html, 2008, p. 1-2.

Virijevich, P., "Live Migration of Xen Domains," http://www.linux.com/feature/55773, Jul. 25, 2006, p. 1-8.

* cited by examiner

NON-DISRUPTIVE, RELIABLE LIVE MIGRATION OF VIRTUAL MACHINES WITH NETWORK DATA RECEPTION DIRECTLY INTO VIRTUAL MACHINES' MEMORY

CROSS-REFERENCE TO RELATED APPLICATIONS

This application is a continuation of U.S. patent application Ser. No. 12/332,800, filed Dec. 11, 2008 now U.S. Pat. No. 7,996,484, the contents of which is incorporated by reference herein in its entirety.

BACKGROUND OF THE INVENTION

Virtualization provides techniques for consolidating physical machines. That is, multiple virtual machines can be executed by a single physical machine.

Virtual machine queue (VMQ) technology enables a receive queue on a VMQ capable hardware network interface card (NIC) to be dedicated to a NIC running in the Virtual Machine (VM). Filters for the media access control (MAC) address of the VM's NIC are configured on the hardware NIC to ensure that the NIC can filter traffic for that VM and indicate it to the virtual service provider running in the host partition in a virtualized environment. Moreover, the common buffer that is used for the hardware NIC's receive buffers is allocated from the VM's memory address space. As a result, the hardware NIC uses direct media access (DMA) to place all incoming frames targeted to the VM's NIC directly to the VM memory. This avoids a copy from the host's memory to the VM's memory that would be necessary in the absence of VMQ.

Live migration allows the transfer of a running virtual machine from one physical machine (the source host) to another physical machine (the target host) without significantly interrupting the service of the operating system running within the virtual machine. The main goal for live migration is to not significantly disrupt the running VM. In particular, client connections (i.e. open TCP connections) to services inside the VM should not be lost. However, packet loss is acceptable during the live migration of a VM.

Enabling VMQ poses certain challenges for live migration. Without VMQ, the receive NIC buffers for the hardware NIC are allocated from the host partition's memory itself. As a result, the physical NIC DMAs the incoming frames into host memory and indicates the network packets to the virtual service provider running in the host partition. The virtual service provider determines the target NIC in the VM and copies the packet data into the VM's memory to be consumed by the VM's networking stack. As the packet data is copied, the virtual service provider can return the ownership of the packets to the physical NIC immediately, even though the received packets are still being processed by the VM's networking stack. The physical NIC is then free to reuse or release the packet resources. In the case of VMQ, since the frames are directly being DMAed to the VM's memory, the virtual service provider indicates the packets to the VM's networking stack and retains the ownership of the packets. As a result of this, the ownership of these packet resources can be returned to the hardware NIC only after the VM's networking stack has completed its processing. When there are outstanding packets in the VM, if the VM is now live migrated to a different host, the VMQ resources allocated for this VM on the hardware NIC in the source host must be freed. As a result of freeing the VMQ, the hardware NIC in turn frees the shared memory allocated for the VMQ after the ownership of all the received packets for the VMQ have been returned to it.

Many enterprise computing scenarios require moving or migrating a network-intensive VM from one physical machine (the source host) to another (the target host) without significant disruption to the networking services provided by the processes running in the VM. Since such a VM hosts network-intensive services, it benefits from network performance optimizations such as VMQ, where network data received by hardware is sent directly into the VM's memory address space.

Live migration—the movement of a VM from one physical host to a second physical host while the VM is continuously active—in the presence of such optimizations poses certain challenges, such as possible data corruption of the packets being processed in the VM networking stack when being migrated. Another challenge is the reliable release of resources to the hardware when the VM has been migrated from the source host.

To that end, there exists a need for techniques that allow for the live migration of a VM that has VMQ or other shared memory access enabled.

SUMMARY

An embodiment of the present invention comprises a VM running on a source computing machine and a target computing machine that is the target of the live migration of the VM. When the live migration is initialized, a source hardware network interface card (NIC) driver is sent an indication to delete a virtual machine queue (VMQ) associated with the VM. Upon receiving this indication, the source NIC driver stops a corresponding source hardware NIC from DMAing any more received network packets destined for the VM into the VMQ. When the hardware NIC has been thus stopped, the source NIC driver notifies a source virtual service provider that this is the case. In response, the source VSP sends the source NIC driver an indication that the source NIC driver has ownership of any network packets in the VMQ. The source NIC driver sends an indication destined for the VM that the shared memory resources associated with the VMQ have been freed. This message is sent through the VSP, which intercepts the message and does not forward it to the VM.

When the VM has been transferred to the target machine via live migration and is running on that target machine, it resumes processing those network packets that were in its memory before the VM was transferred to the target machine. When the VM processes each network packet, it sends a message through the target VSP an indication intended for the source NIC driver and destined for the target NIC driver to release the resources corresponding to the processed packet. The target VSP intercepts each indication and does not forward it to the target NIC driver. When the VM has processed all network packets that were in its memory before the VM was transferred to the target machine, the target VSP sends the VM an indication to free the shared memory associated with those packets.

Since the VM may be in a paused state when being live migrated, one cannot rely on the VM to return the outstanding packets prior to being migrated to the target host. Therefore, the virtual service provider keeps track of the packets that are outstanding in the VM and returns the ownership of the corresponding packets to the hardware NIC on behalf of the VM. At this time, the VM networking stack has not yet completed the processing of the packets. Therefore, one cannot allow the hardware NIC to DMA any further data to the same memory. But if the virtual service provider returns the ownership of the packets, the NIC is free to DMA to the memory corresponding to the returned packet, thus corrupting the packet that is still being processed by the VM. This can have untoward results in the VM's networking stack including data corruption and crashes. Therefore, when the hardware NIC driver is notified to delete the VMQ associated with the VM, it stops the hardware from DMAing any more data to the NIC buffers associated with that VMQ. It generates a notification once the DMA is stopped so that the virtual service provider can then "fake-return" the ownership of the packets back to the hardware NIC. The virtual service provider also keeps track of the shared memory resources freed by the NIC to the VM and saves this information for use by the virtual service provider running in the target host.

Once the VM is resumed on the target host, it completes the processing of the packets and returns the ownership of the resources corresponding to these packets. The virtual service provider consumes these resources as the corresponding packet resources have already been returned the NIC in the source host. Once all the packets indicated to the VM networking stack have been returned, the shared memory allocated for the VMQ in the source host is freed back to the VM. This ensures a reliable release of resources in the hardware NIC, the host partition as well as the VM in the event of Live migration.

This solution is not restricted to VMQ technology and can be used for all network technologies where the network data is DMAed to the VM memory address space directly.

These techniques are not restricted to live migration scenarios. It can be used in cases where the Virtual Machine has crashed and therefore unable to release the resources to the hardware. The techniques may also be used in the case of a malicious VM which does not return the resources in a timely manner.

Systems, methods, and computer readable storage media that perform the above and similar processes are disclosed.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
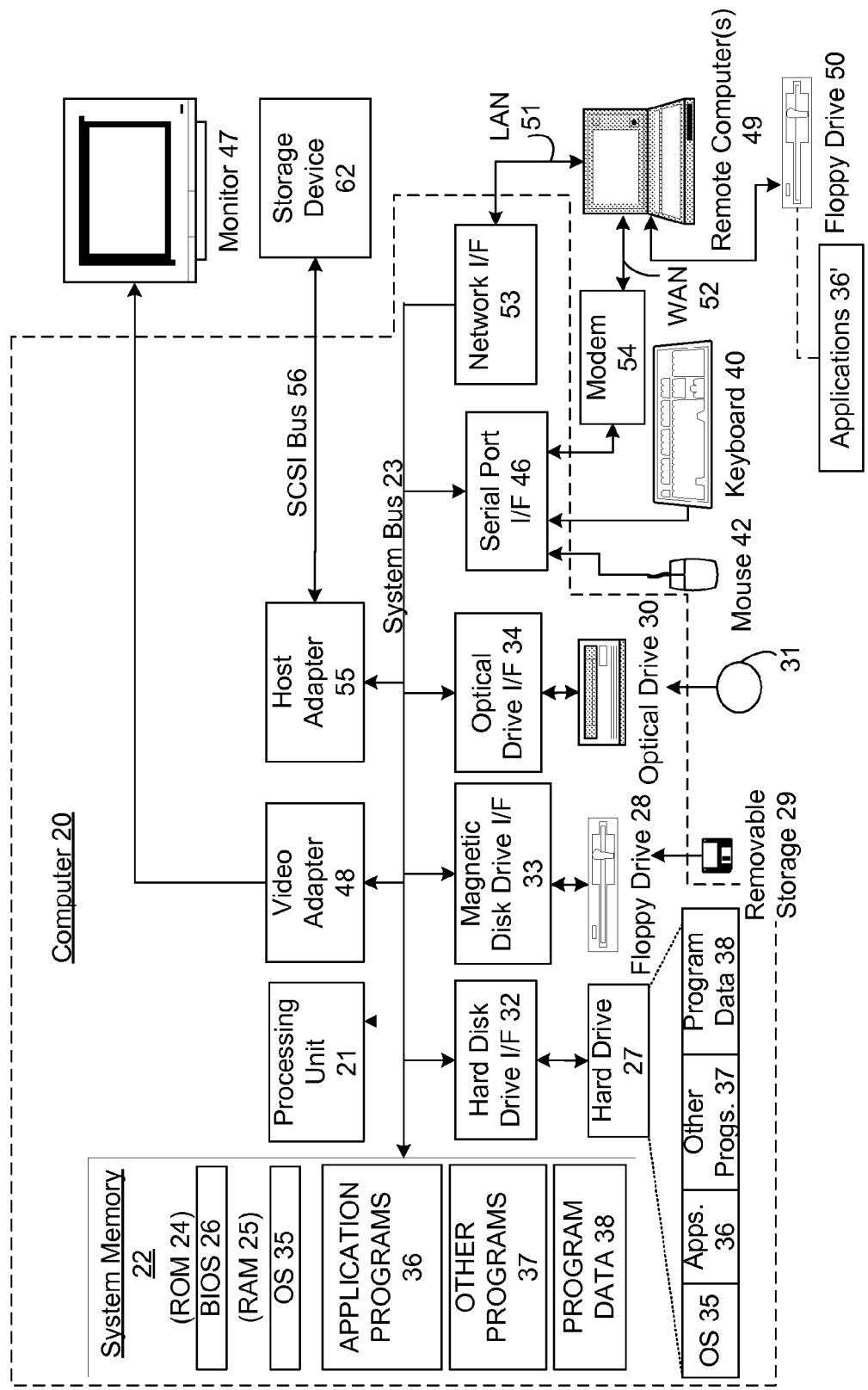
FIG. 1 depicts an example computer system wherein aspects of the present disclosure can be implemented.

Embodiments of the present disclosure may execute on one or more computers. FIG. 1 and the following discussion are intended to provide a brief general description of a suitable computing environment in which the disclosure may be implemented. One skilled in the art can appreciate that some or all of the components of the computer system of FIG. 1 can be used to effectuate the computer of FIG. 2.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Figure 2:
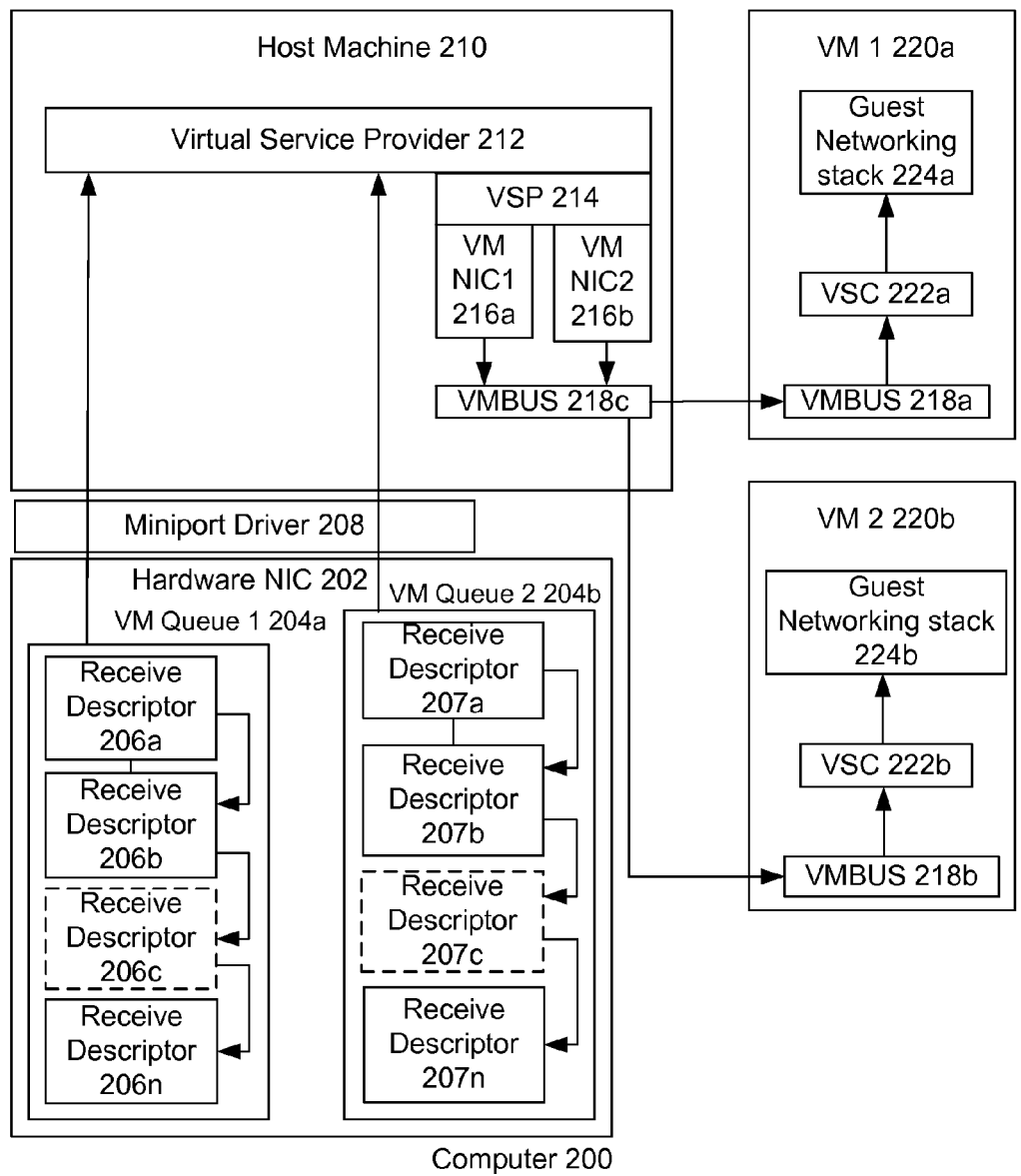
FIG. 2 depicts an example operating environment in which the teachings of the present disclosure may be practiced.

FIG. 2 depicts an exemplary system that implements embodiments of the present disclosure—a system where a shared memory space of a VM is directly written to by an entity outside of the VM. Here, a hardware NIC is able to write received packets directly to a shared memory of the VM, which decreases the time that it takes for a VM to receive a packet sent from a computer network.

The computing system 200 comprises a hardware NIC 202 connected to a host OS 210 via a miniport driver 208. In an embodiment, the miniport driver 208 is a software component that enables computer programs to interact with a hardware device. In this instance, the host OS 210 is such a software component and the NIC is such a hardware device. Additionally, two virtual machines 220 are running on the computing system 200 and connected to the host OS 210 via a VM bus 218.

Network communications are received by the computing system 200 at the NIC 202. In an embodiment, the NIC comprises computer hardware that enables computers to send and receive network communications across a computer network. When a packet is received, the NIC 202 determines which VM OS the packet is destined for. In an embodiment, this comprises reading the packet to determine a destination IP address that corresponds to an IP address of a particular VM OS.

In an embodiment, each received packet, or a reference thereto, is placed in a VM queue (VMQ) corresponding to the VM OS that the packet is destined for. The VMQ may comprise a linked list of receive descriptors, where one receive descriptor corresponds to one received network packet, and the first packet added to the queue is the first packet removed from the queue.

The NIC uses a direct memory access (DMA) command to place packet in the memory space of the corresponding VM OS 220. A DMA allows a hardware subsystem within a computer to read from or write to system memory independently of the central processing unit (CPU) of the computer. Such a means of data transfer reduces CPU overhead and increases throughput of data transfer. In this case, the NIC is such a hardware subsystem and the memory space of the host OS and the memory space of the VM OS are system memory. Where memory must be allocated in the VM OS to store the packet, the host OS requests the VM to allocate memory for the packet. This interface between the host and the VM allows for allocation and release of memory from the VM's memory address space on demand.

The NIC also stores a receive descriptor for the packet in the VMQ corresponding to the VM that the packet is destined for. The receive descriptor comprises an indication of the packet stored in the memory space of the VM OS.

The NIC sends the host OS an indication that the packet has been received to a virtual service provider 212 running on the host OS. In an embodiment, the virtual service provider is a software platform that provides networking services to multiple operating systems running on a host computer simultaneously.

The virtual service provider 212 includes a virtualization service provider (VSP) 214 for networking, which is a software component that directly communicates with hardware drivers. It ensures that virtual machines can access the hardware successfully and that hardware access and sharing by multiple VMs is secure. The virtual service provider also includes a VM NIC for each VM OS. In an embodiment, where there are a plurality of hardware NICs, the virtual switch drives includes a VM NIC for each hardware NIC exposed to the VM OS. A VM NIC is a software component that presents to a corresponding VM an interface identical to that of a hardware NIC. When it receives communications from the VM OS across the VMBus, it transmits those through the virtual switch to the hardware NIC.

The host OS also comprises a VMBus 218, which is a point-to-point in memory bus used by a VSP and a virtualization service client (VSC) 222 to cross-communicate. In the present embodiment, each VM NIC and the corresponding VSC for a virtual machine communicate through the VMBus. A VSC is a software component that runs in a VM OS and presents the virtualization device (here the corresponding VM NIC) to the VM OS.

Each VSC 222 in turn communicates with a corresponding guest networking stack 224, which is a software component implementation of a computer networking protocol suite.

Figure 3:
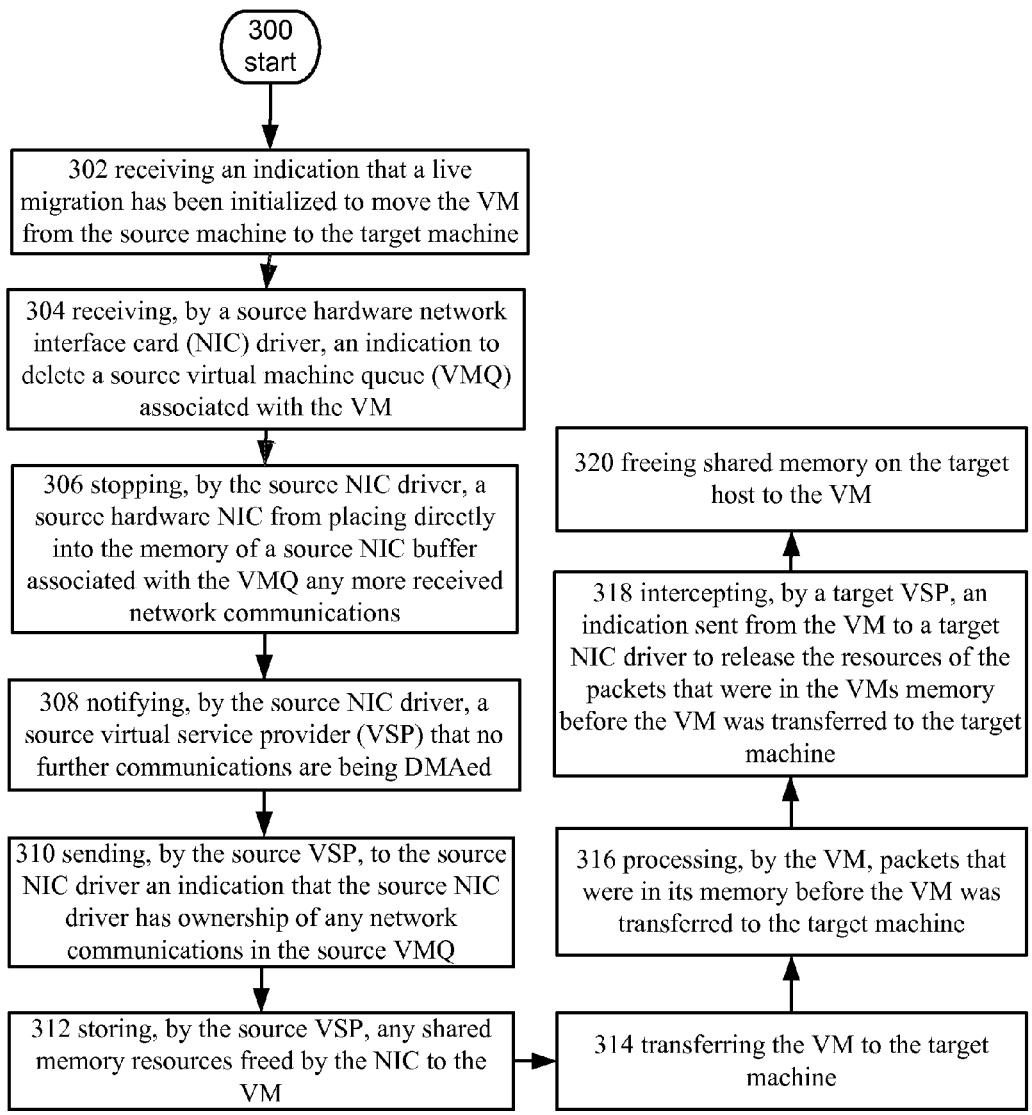
FIG. 3 depicts example operating procedures for the present disclosure.

FIG. 3 depicts an exemplary process flow for the live migration of a VM from a source host to a target host where the VM has packets directly placed into its memory address space.

Operation 302 depicts receiving an indication that a live migration has been initialized to move the VM from the source machine to the target machine. This can be prompted, for instance, by an end user at a terminal selecting a live migration option either through a typed command at a terminal or selecting a corresponding option through a graphical user interface (GUI). It may also be prompted without direct user input, such as a specified periodic live migration.

Operation 304 depicts receiving, by a source hardware network interface card (NIC) driver, an indication to delete a source virtual machine queue (VMQ) associated with the VM. In an embodiment, the NIC driver is notified this by a virtual service provider (VSP) resident on the host partition. It may use a message such as one through the network driver interface specification (NDIS) of MICROSOFT™ WINDOWS™ operating systems. Where the NDIS interface is used, an OID_RECEIVE_FILTER_FREE_QUEUE instruction may be sent. When the NIC driver receives and processes this, it frees the resources for the VMQ that it allocated for it in software as well as hardware.

Operation 306 depicts stopping, by the source NIC driver, a source hardware NIC from placing directly into the memory of a source NIC buffer associated with the VMQ any more received network communications. In an embodiment, the NIC driver is a software component that runs on a processor that allows high-level computer programs to interact with the hardware NIC. In an embodiment, this placing is accomplished through a direct memory access (DMA), which allows the NIC to access system memory and write to it and read from it independently of a central processing unit. In an embodiment, the NIC driver communicates this to the NIC by setting a register with a value indicative of stopping DMAs, and is hardware-dependent—the specific technique used varying with the differences between different physical NICs.

Operation 308 depicts notifying, by the source NIC driver, a source virtual service provider (VSP) that no further communications are being DMAed. Where communications through NCIS are being used, as discussed above in operation 304, this may be accomplished through a NCIS message.

Operation 310 depicts sending, by the source VSP, to the source NIC driver an indication that the source NIC driver has ownership of any network communications in the source VMQ. In an embodiment where the VMQ comprises at least one receive descriptor, this may comprise an indication that the source NIC driver has ownership of all receive descriptors in the source VMQ. This may be considered a "fake return" as opposed to a real return of resources because, from the VM's point of view, the resources are not actually returned. In an embodiment, the NIC frees any shared memory resources associated with the VMQ, for instance receive descriptors.

Operation 312 depicts storing, by the source VSP, any shared memory resources freed by the NIC to the VM. In an embodiment, when the NIC and NIC driver have freed all shared memory resources associated with the VMQ, the NIC driver sends an indication to the source VSP that those resources have been freed. Those resources correspond to packets that the VM has not yet processed, and will process after having been live migrated to the target machine. Therefore, the VSP keeps track of these resources, so that when the VM is running on the target machine, it may access and then finish processing them. This storing of the resources is in lieu of returning those resources to the VM, as may occur in a situation where the VM truly is done processing the associated packets. In an embodiment, those resources are stored in the VM. In an embodiment, information about those resources, such as the number of packets outstanding in the VM is also saved in the VM. When the VM is migrated to the target machine, that information, being part of the VM, is migrated with it.

Operation 314 depicts transferring the VM to the target machine. In an embodiment, this comprises to a live migration of the VM from the source machine to the target machine. In an embodiment where the VM is paused while the live migration takes place, this may include unpausing the VM so that it executes on the target machine. In an embodiment where the VM is paused while it is on the source machine, network communications received for it on the source machine are dropped while it is in this paused state. While this impacts performance, because those communications are not processed, the VM may then be maintained in a static state and copied. If packets are continually being added to the VM while it is being copied, the contents of the VM's memory will continually change, and one may not be certain what the contents of the memory are when the VM is fully copied to the target machine. Dropped packets are not a significant issue—there are mechanisms in communications protocols such as the transmission control protocol/internet protocol (TCP/IP) for re-sending unacknowledged packets. The damage caused by allowing packets to be received while the live migration takes place may be much more significant. This may result in pointers to data or data structures given to components that have no indication of where data has come from. It may further lead to memory leaks, data corruption, and crashing the VM.

Operation 316 depicts processing, by the VM, packets that were in its memory before the VM was transferred to the target machine. In an embodiment, the VM is copied from the source machine to the target machine with the outstanding packets in its memory included. Thus, when the live migration has been completed and the VM is running on the target machine, it still has those packets available to it in its memory and can resume processing them.

Operation 318 depicts intercepting, by a target VSP, an indication sent from the VM to a target NIC driver to release the resources of the packets that were in the VMs memory before the VM was transferred to the target machine. The VM is attempting to return resources to the source NIC driver. However, since it now operates on the target machine, it is the target NIC driver that would receive the indication if the indication were not intercepted. The target NIC driver does not have a prior association with those resources, so if sent an indication to release those resources, it would lack instructions as to how to properly proceed. Therefore, the target VSP detects these indications as they arrive from the VM, and does not forward them to the target NIC driver as indicated. The target VSP may identify which such indications correspond to packets that were in the VMs memory before the VM was transferred to the target machine because those packets did not have an indication from the target NIC driver to the VM that a packet had been received.

In a typical sequence where the indication was not intercepted, when the VM finishes processing a packet, it returns any resources associated with it to the VSP. Where there is a VMQ, the VSP, in turn, returns the corresponding NIC buffer resource back to the hardware NIC.

Operation 320 depicts freeing shared memory on the target host to the VM. In an embodiment, this occurs after all the packets that were live migrated with the VM to the target machine have been processed by the VM on the target machine. In this embodiment, the target VSP must wait until all packets represented in this shared memory are returned by the VM. If the target VSP frees the shared memory to the VM as soon as it starts running on the target machine and while the VM is still processing a packet that has been DMA'ed to some part of that shared memory, this action can cause the VM to crash.

In an embodiment, when the VM has been live migrated to the target host and is running, the target VSP checks if the target NIC supports VMQ. If so, the target VSP initiates allocating a VMQ with the target NIC. If the target NIC does not support VMQ, then a VMQ is not used and packets are indicated to the VM by sending them through the host, or other supported methods.

What is claimed:

1. A method for non-disruptive and reliable transfer of a virtual machine (VM) from a source machine to a target machine while the VM is continuously powered up, wherein the source machine places network data directly into memory resources shared with the VM, comprising:
stopping network communications from being placed in the memory resources shared with the VM;
notifying a source virtual service provider (VSP) that no further communications are being placed in the memory resources shared with the VM;
sending, by the source VSP, to a source hardware NIC driver that is associated with the memory resources shared with the VM, an indication that the source hardware NIC driver has ownership of the memory resources shared with the VM;
transferring the VM to the target machine;
processing unprocessed network packets that were in the shared memory resources on the source machine; and
preventing the VM from freeing resources corresponding to the unprocessed network packets that were in the shared memory resources on the source machine on the target machine.

2. The method of claim 1, further comprising:
receiving, by the source hardware NIC driver, an indication to delete a the memory resources shared with the VM, the memory resources comprising a receive descriptor of the NIC before stopping network communications from being placed in the memory resources shared with the VM.

3. The method of claim 1, wherein stopping network communications from being placed in the memory resources shared with the VM comprises:
stopping, by the source hardware NIC driver, a source hardware NIC from placing directly into the memory of a source NIC buffer associated with the memory resources any more network communications received across a communications network.

4. The method of claim 1, wherein notifying the source VSP that no further communications are being placed in the memory resources shared with the VM comprises:
notifying, by the source hardware NIC driver, the source VSP that no further communications are being direct memory accessed (DMA'ed) into the memory resources.

5. The method of claim 1, further comprising:
storing, by the source VSP, memory resources freed by the source hardware NIC driver to the VM.

6. The method of claim 1, wherein preventing the VM from freeing resources corresponding to the unprocessed network packets that were in the shared memory resources on the source machine on the target machine comprises:
intercepting, by a target VSP, an indication sent from the VM to a target NIC driver to release the resources of the packets that were in the shared memory resources before the VM was transferred to the target machine.

7. The method of claim 1, wherein network data comprises at least one network packet, wherein the source machine places network data into a virtual machine queue (VMQ) corresponding to the VM, the VMQ comprising at least one receive descriptor, each receive descriptor corresponding to a network packet in the shared memory resources.

8. The method of claim 1, further comprising
dropping all network communications received for the VM after placing network communications directly into the memory of the a NIC buffer associated with the memory resources is stopped.

9. A system for non-disruptive and reliable transfer of a virtual machine (VM) from a source machine to a target machine while the VM is continuously powered up, wherein the source machine places network data directly into memory resources shared between a network interface card (NIC) of the source machine and the VM, comprising:
a processor; and
a memory communicatively coupled to the processor when the system is operational, the memory bearing processor-executable instructions that, upon execution by the processor, cause the system to at least:
stop network communications from being placed in the memory resources shared with the VM;
notify a source virtual service provider (VSP) that no further communications are being placed in the memory resources shared with the VM;
send, by the source VSP, to a source hardware NIC driver that is associated with the memory resources shared with the VM, an indication that the source hardware NIC driver has ownership of the memory resources shared with the VM;
transfer the VM to the target machine;
process unprocessed network packets that were in the shared memory resources on the source machine; and
prevent the VM from freeing resources corresponding to the unprocessed network packets that were in the shared memory resources on the source machine on the target machine.

10. The system of claim 9, wherein the processor-executable instructions that, upon execution by the processor, cause the system to at least transfer the VM to the target machine further cause the system to at least:
live migrate the VM from the source machine to the target machine.

11. The system of claim 9, wherein the processor-executable instructions that, upon execution by the processor, cause the system to at least prevent the VM from freeing resources corresponding to the unprocessed network packets that were in the shared memory resources on the source machine on the target machine further cause the system to at least:

intercept, by a target VSP, an indication sent from the VM to a target NIC driver to release the resources of the packets that were in the shared memory resources before the VM was transferred to the target machine.

12. The system of claim 9, wherein the memory further bears processor-executable instructions that, upon execution by the processor, cause the system to at least:

free shared memory on the target machine to the VM.

13. The system of claim 9, wherein the memory further bears processor-executable instructions that, upon execution by the processor, cause the system to at least:

receive an indication that a live migration has been initialized to move the VM from the source machine to the target machine.

14. The system of claim 9, wherein network data comprises at least one network packet, wherein the source machine places network data into a virtual machine queue (VMQ) corresponding to the VM, the VMQ comprising at least one receive descriptor, each receive descriptor corresponding to a network packet in the shared memory resources.

15. The system of claim 9, wherein the memory further bears processor-executable instructions that, upon execution by the processor, cause the system to at least:

drop all network communications received for the VM after placing network communications directly into the memory of a source NIC buffer associated the memory resources is stopped.

16. The system of claim 9, wherein the shared memory resources comprise a subset of the VM's memory address space.

17. A computer readable storage medium excluding signals bearing instructions for non-disruptive and reliable live migration of a virtual machine (VM) from a source machine to a target machine while the VM is continuously powered up, wherein the source machine places network data directly into memory resources shared between a network interface card (NIC) of the source machine and the VM, that when executed on a computer, cause operations comprising:

stopping network communications from being placed in the memory resources shared with the VM;

notifying a source virtual service provider (VSP) that no further communications are being placed in the memory resources shared with the VM;

sending, by the source VSP, to a source hardware NIC driver that is associated with the memory resources shared with the VM, an indication that the source hardware NIC driver has ownership of the memory resources shared with the VM;

transferring the VM to the target machine;

processing unprocessed network packets that were in the shared memory resources on the source machine; and preventing the VM from freeing resources corresponding to the unprocessed network packets that were in the shared memory resources on the source machine on the target machine.

18. The computer readable storage medium of claim 17, wherein stopping network communications from being placed in the memory resources shared with the VM comprises:

dropping network communications received for the VM after placing network communications in the shared memory resources is stopped.

19. The computer readable storage medium of claim 17, wherein the shared memory resources comprises a subset of the VM's memory address space.

20. The computer readable storage medium of claim 17, further bearing instructions that, when executed on the computer, cause operations comprising:

receiving, by the source hardware NIC driver, an indication to delete a the memory resources shared with the VM, the memory resources comprising a receive descriptor of the NIC before stopping network communications from being placed in the memory resources shared with the VM.

\* \* \* \* \*